(12) United States Patent
Alsafadi (10) Patent No.: US 9,818,053 B2
(45) Date of Patent: Nov. 14, 2017

(54) IDENTIFICATION OF OBJECTS USING FREQUENCY CHARACTERISTICS OF RFID TAGS

(75) Inventor: Yasser Alsafadi, Yorktown Heights, NY (US)

(73) Assignee: Koninklijke Philips N.V., Eindhoven (NL)

( * ) Notice: Subject to any disclaimer, the term of this patent is extended or adjusted under 35 U.S.C. 154(b) by 1392 days.

(21) Appl. No.: 12/747,548

(22) PCT Filed: Dec. 9, 2008

(86) PCT No.: PCT/IB2008/055182
§ 371 (c)(1),
(2), (4) Date: Feb. 14, 2011

(87) PCT Pub. No.: WO2009/081303
PCT Pub. Date: Jul. 2, 2009

(65) Prior Publication Data
US 2011/0133903 A1 Jun. 9, 2011

Related U.S. Application Data

(60) Provisional application No. 61/014,970, filed on Dec. 19, 2007.

(51) Int. Cl.
*H04Q 5/22* (2006.01)
*G05B 23/02* (2006.01)
(Continued)

(52) U.S. Cl.
CPC .......... *G06K 17/00* (2013.01); *G06K 7/10069* (2013.01); *G06K 19/0672* (2013.01); *G06K 19/0724* (2013.01); *G06K 2017/0035* (2013.01)

(58) Field of Classification Search
CPC .......... G06K 2017/0051; G06K 17/00; G06K 17/0022; G06K 2017/0045;
(Continued)

(56) References Cited

U.S. PATENT DOCUMENTS 5,119,070 A * 6/1992 Matsumoto et al. ...... 340/572.5
5,786,764 A * 7/1998 Engellenner ............... 340/572.4
(Continued)

FOREIGN PATENT DOCUMENTS

CN 1711564 A 12/2005
DE 19802975 A1 * 7/1999
(Continued)

OTHER PUBLICATIONS

English Translation of Japanese Document: JP2004198139; Published on Jul. 15, 2004; Translated on Mar. 3, 2014.*

*Primary Examiner* — Steven Lim
*Assistant Examiner* — Muhammad Adnan (57) ABSTRACT

An apparatus that identifies an object includes a frequency detector (112) that detects a frequency over which an RFID tag (102) communicates, and an object identifier (120) that identifies the object based at least in part upon the detected frequency. The frequency detector may detect a plurality of frequencies over which a plurality of RFID tags transmit information. The apparatus also optionally includes a frequency pattern generator that generates a frequency pattern that is indicative of an identity of the object, wherein the object identifier compares the generated frequency pattern with known frequency patterns to determine the identity of the object.

15 Claims, 6 Drawing Sheets

(51) Int. Cl.
  *H04L 12/18* (2006.01)
  *G08B 5/22* (2006.01)
  *H04Q 1/30* (2006.01)
  *G08B 26/00* (2006.01)
  *G08B 13/14* (2006.01)
  *G08C 17/00* (2006.01)
  *G06K 17/00* (2006.01)
  *G06K 7/10* (2006.01)
  *G06K 19/067* (2006.01)
  *G06K 19/07* (2006.01)

(58) Field of Classification Search
  CPC ........... G06K 7/10297; G06K 7/10346; G06K 19/0672; G06K 7/10019; G06K 7/10217; G06K 7/10336; G06K 7/10356; G08B 13/2417; G08B 13/2471; G08B 13/2474
  USPC ............................................... 340/10.1–10.6
  See application file for complete search history.

(56) References Cited

U.S. PATENT DOCUMENTS

| | | | | |
|---|---|---|---|---|
| 6,094,133 | A * | 7/2000 | Shimamura et al. | 340/505 |
| 6,127,928 | A * | 10/2000 | Issacman et al. | 340/572.1 |
| 7,091,861 | B2 | 8/2006 | Schmidtberg et al. | |
| 8,979,756 | B2 | 3/2015 | Alsafadi et al. | |
| 2002/0145036 | A1 * | 10/2002 | Otto | 235/383 |
| 2003/0197612 | A1 * | 10/2003 | Tanaka et al. | 340/572.1 |
| 2004/0066279 | A1 * | 4/2004 | Hughes | G06K 7/10019 340/10.1 |
| 2004/0066281 | A1 * | 4/2004 | Hughes | G06K 7/0008 340/10.2 |
| 2004/0075560 | A1 * | 4/2004 | Hartmann | G08B 13/2417 340/572.1 |
| 2004/0155106 | A1 * | 8/2004 | Schmidtberg et al. | 235/383 |
| 2005/0278776 | A1 | 12/2005 | Kitagawa et al. | |
| 2006/0220856 | A1 * | 10/2006 | Shaffer et al. | 340/572.1 |
| 2006/0238307 | A1 * | 10/2006 | Bauer et al. | 340/10.1 |
| 2006/0250253 | A1 * | 11/2006 | Liu | B07C 5/3412 340/572.7 |
| 2006/0267731 | A1 * | 11/2006 | Chen | 340/10.1 |
| 2006/0290473 | A1 | 12/2006 | Mahasenan et al. | |
| 2007/0030116 | A1 | 2/2007 | Feher | |
| 2007/0129983 | A1 | 6/2007 | Scherpbier et al. | |
| 2009/0279725 | A1 * | 11/2009 | Leeper, Jr. | H04R 27/02 381/314 |
| 2010/0225454 | A1 * | 9/2010 | Inano | G06K 19/0702 340/10.31 |
| 2010/0316334 | A1 * | 12/2010 | Kewitsch | G02B 6/3502 385/78 |

FOREIGN PATENT DOCUMENTS

| | | |
|---|---|---|
| GB | 2390511 A | 1/2004 |
| JP | S5478097 A | 6/1979 |
| JP | S6310293 A | 1/1988 |
| JP | H11174149 A | 2/1999 |
| JP | 2000049655 A | 2/2000 |
| JP | 2004-198139 A | 7/2004 |
| JP | 2004198139 A * | 7/2004 |
| JP | 2004205451 A | 7/2004 |
| JP | 2008182573 A * | 8/2008 |
| WO | 2006005148 A2 | 1/2006 |
| WO | 2006048806 A1 | 5/2006 |
| WO | 2007000740 A1 | 1/2007 |

* cited by examiner

IDENTIFICATION OF OBJECTS USING FREQUENCY CHARACTERISTICS OF RFID TAGS

The present application relates to object identification by way of radio-frequency identification (RFID) tags.

An RFID tag typically includes two portions: 1) an integrated circuit for storing information, processing information, and modulating or demodulating a radio frequency (RF) signal (and possibly other specialized functions); and 2) an antenna for receiving and transmitting radio frequency signals. Additionally, RFID tags can include passive RFID tags, active RFID tags, and semi-active RFID tags. A passive RFID tag is powered by incoming radio frequency signals received from an RFID reader, and does not include an internal power source. In contrast, an active RFID tag includes an internal power source for powering an integrated circuit and transmitting a radio frequency signal to an RFID reader. A semi-active RFID tag has an internal power source to supply power to an integrated circuit but not to provide power for broadcasting a signal and vice versa.

For an RFID reader to receive content of an RFID tag, the RFID reader must be tuned to a frequency used by the RFID tag to transmit information. Conventionally, RFID tags are designed to communicate over one of four predefined frequency ranges: low (approximately 125 KHz), high (approximately 13.56 MHz), ultra high frequency (UHF) (approximately 850 MHz to 900 MHz), or microwave (approximately 2.45 GHz). Non-similar frequencies have different characteristics with respect to radio waves; accordingly, different frequencies are better suited for different applications with respect to RFID technologies. For example, RFID tags that are designed to transmit at low frequencies require less power when compared to RFID tags that are designed to transmit at ultra high frequencies (UHF). In addition, information transmitted at a low frequency is better able to penetrate non-metallic substances when compared with information transmitted at UHF. However, information may be transmitted over greater distances using UHF.

A pallet may include a thousand items and thus may include a thousand RFID tags. If the RFID tags are passive, each of the thousand RFID tags must be powered by radio waves transmitted by an RFID reader, each integrated circuit must be accessed, and information must be transmitted from each RFID tag. This would require a significant amount of time.

Aspects of the present application address these matters and others.

According to one aspect of the present application, a method for identifying an object comprises detecting a frequency over which an RFID tag communicates and identifying the object based at least in part upon the detected frequency.

According to another aspect, an apparatus that identifies an object comprises a frequency detector that detects a frequency over which an RFID tag communicates and an object identifier that identifies the object based at least in part upon the detected frequency.

According to another aspect, a computer-readable medium comprising instructions that, when executed by a processor, perform acts of performing a frequency scan for spectral agile radio RFID tags, preparing a list of detected RFID tags based at least in part upon frequencies detected during the frequency scan, constructing a list of potential objects based at least in part upon the detected frequencies, and constructing a list of identified objects based at least in part upon a context assigned to the spectral agile radio RFID tags.

According to yet another aspect, a data repository includes frequency patterns that correspond to a plurality of objects, wherein an object is identified by comparing an observed frequency pattern with at least a subset of the frequency patterns in the data repository.

Those skilled in the art will appreciate still other aspects of the present application upon reading and understanding the attached figures and description.

The present application is illustrated by way of example and not limitation in the figures of the accompanying drawings, in which like references indicate similar elements and in which.

Figure 1:
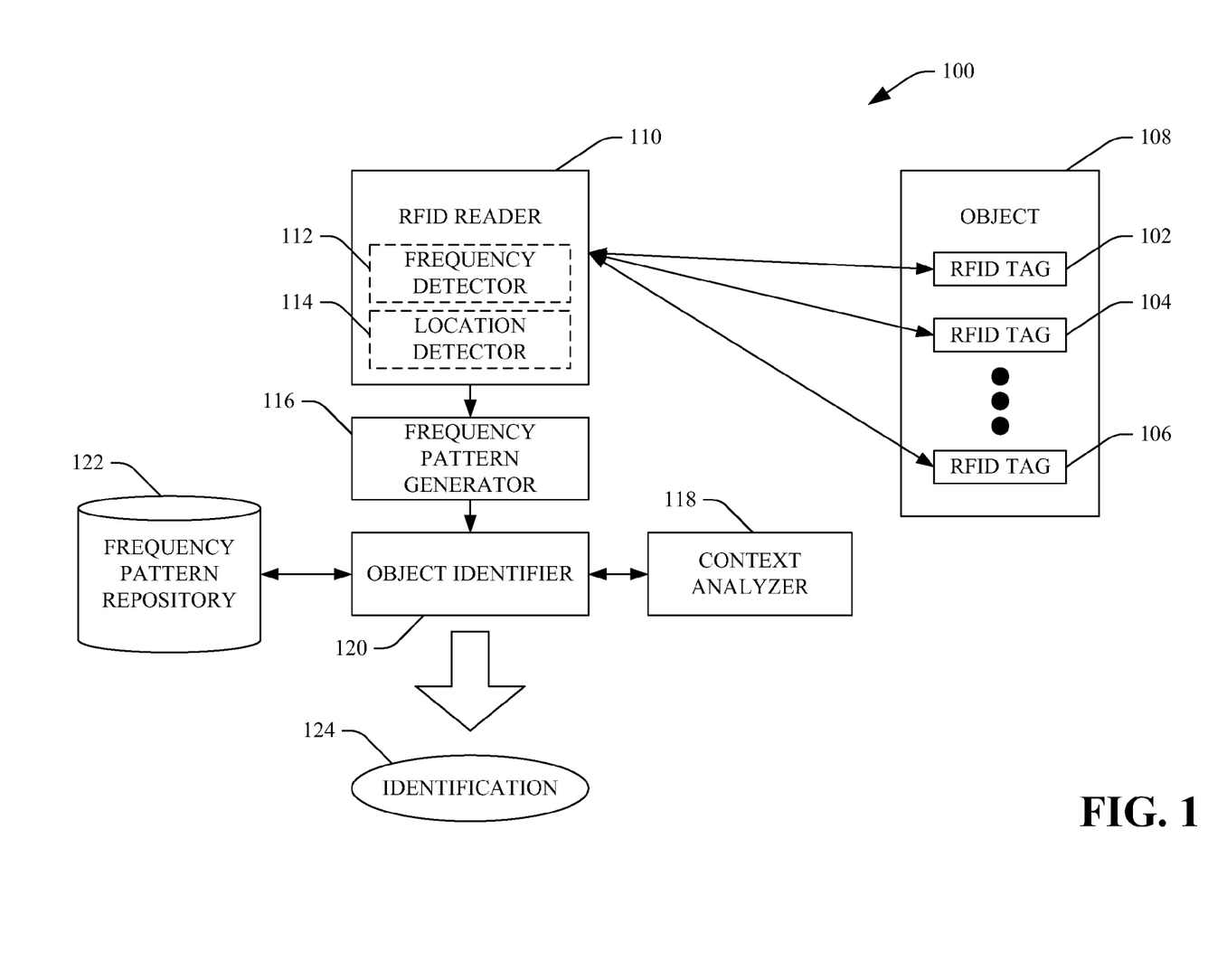
FIG. 1 depicts an apparatus that identifies an object.

With reference to FIG. 1, an apparatus 100 that identifies an object 108 is illustrated. The apparatus 100 includes a plurality of RFID tags 102, 104, and 106 that correspond to the object 108. The object 108 is for instance a tangible object, such as a medical supply cart that includes a plurality of different types of medicines and/or medical equipment, or an intangible object, such as a treatment plan for a patient. Accordingly, the RFID tags 102, 104, and 106 are embedded in the object 108, attached to the object 108, and/or embedded or attached to objects that collectively define an intangible object. The RFID tags 102, 104, and 106 are passive RFID tags, active RFID tags, semi-active RFID tags, or a combination thereof. Moreover, the RFID tags are not confined to the four frequencies that are typically assigned to RFID tags, but instead are capable of communicating over various portions of the frequency spectrum. For instance, spectrum agile radio (SARA) technologies open spectrum use in space and time to allow devices to transmit over frequencies that have heretofore been restricted to certain types of communications. Accordingly, as alluded to above, the RFID tags 102, 104, and 106 are designed to communicate over a wide range of frequencies (e.g., in accordance with SARA protocols).

An RFID reader 110 optionally includes a transmitter (not shown) that emits radio waves that provide power to RFID tags 102, 104, and 106 if they are passive RFID tags. The RFID reader 110 also receives signals transmitted from the RFID tags 102, 104, and 106, wherein the signals include information that identifies the RFID tags 102, 104, and 106 and/or other content stored in memory. The apparatus 100 additionally includes a frequency detector 112 that detects a frequency used by the RFID tags 102, 104, and 106 to transmit information. For instance, the frequency detector 112 is capable of performing a frequency sweep and detecting frequencies used by the RFID tags 102, 104, and 106 to transmit information, wherein a frequency sweep can monitor frequencies that are continuous over a range or monitoring discrete frequencies. The apparatus 100 also optionally includes a location detector 114 that analyzes frequencies used by the RFID tags 102, 104, and 106 and detects locations of the RFID tags 102, 104, and 106 relative to the RFID reader 110 and relative to one another based upon the detected frequencies and strength of signals emitted by the RFID tags 102, 104, and 106.

A frequency pattern generator 116 receives frequency information detected by the frequency detector 112 and creates a frequency pattern based upon the received information. Frequency patterns created by the frequency pattern generator 116 have the general form of {Af1; Bf2; . . . . Xfn}, where A, B, and X are integers that indicate a number of RFID tags that transmit information over frequencies f, and n is a number of frequencies detected. For instance, a frequency pattern includes frequencies used by the RFID tags 102, 104, and 106 and a number of RFID tags that use each frequency. An example frequency pattern is provided below for illustrative purposes.

1f1; 2f2; 1f3; 2f4; 1f5

The above frequency pattern indicates that one RFID tag was found to be transmitting at a first frequency, two RFID tags were found to be transmitting at a second frequency, one RFID tag was found to be transmitting at a third frequency, two RFID tags were found to be transmitting at a fourth frequency, and one RFID tag was found to be transmitting at a fifth frequency. While shown as solely including detected frequencies and numbers of RFID tags, it is to be understood that the frequency pattern generator 116 can generate a pattern that includes frequencies detected as well as content and/or unique identity of one or more RFID tags.

The apparatus also optionally includes a context analyzer 118 that determines a context corresponding to the apparatus 100. The determined context indicates, for instance, that the object 108 is an object related to healthcare (e.g., a healthcare object), an object in an industrial setting (e.g., an industrial object), an object in a retail setting (e.g., a retail object), etc. An object identifier 120 receives the frequency pattern created by the frequency pattern generator 116 and compares the frequency pattern to known frequency patterns in a frequency pattern repository 122, which is a computer-readable medium. The object identifier 120 also optionally uses contextual information provided by the context analyzer 118 when comparing the received frequency pattern with frequency patterns in the frequency pattern repository 122. Based upon the comparison of the received frequency pattern and the frequency patterns in the frequency pattern repository 122, the object identifier 120 outputs an identification 124 that identifies the object 108. The identification 124 is output to a display screen or a printer, and/or stored in a computer-readable medium, or the like.

Accordingly, the object 108 is identified based primarily on frequencies used by the RFID tags 102, 104, and 106 and not based solely upon content of the RFID tags 102, 104, and 106. Therefore, the object 108 may be identified in less time using less power when compared to conventional manners for identifying objects by way of RFID technologies, as unique identity and content need not be read from each RFID tag to identify an object.

The RFID reader 110, the frequency pattern generator 116, the context analyzer 118, the object identifier 120, and the frequency pattern repository 122 may be included in a single device, such as a handheld apparatus. In another example, at least some of the aforementioned modules and the frequency pattern repository 122 may be included in separate devices; for instance, the frequency pattern repository 122 may be located on a server that is accessible by way of the Internet or an intranet.

Figure 2:
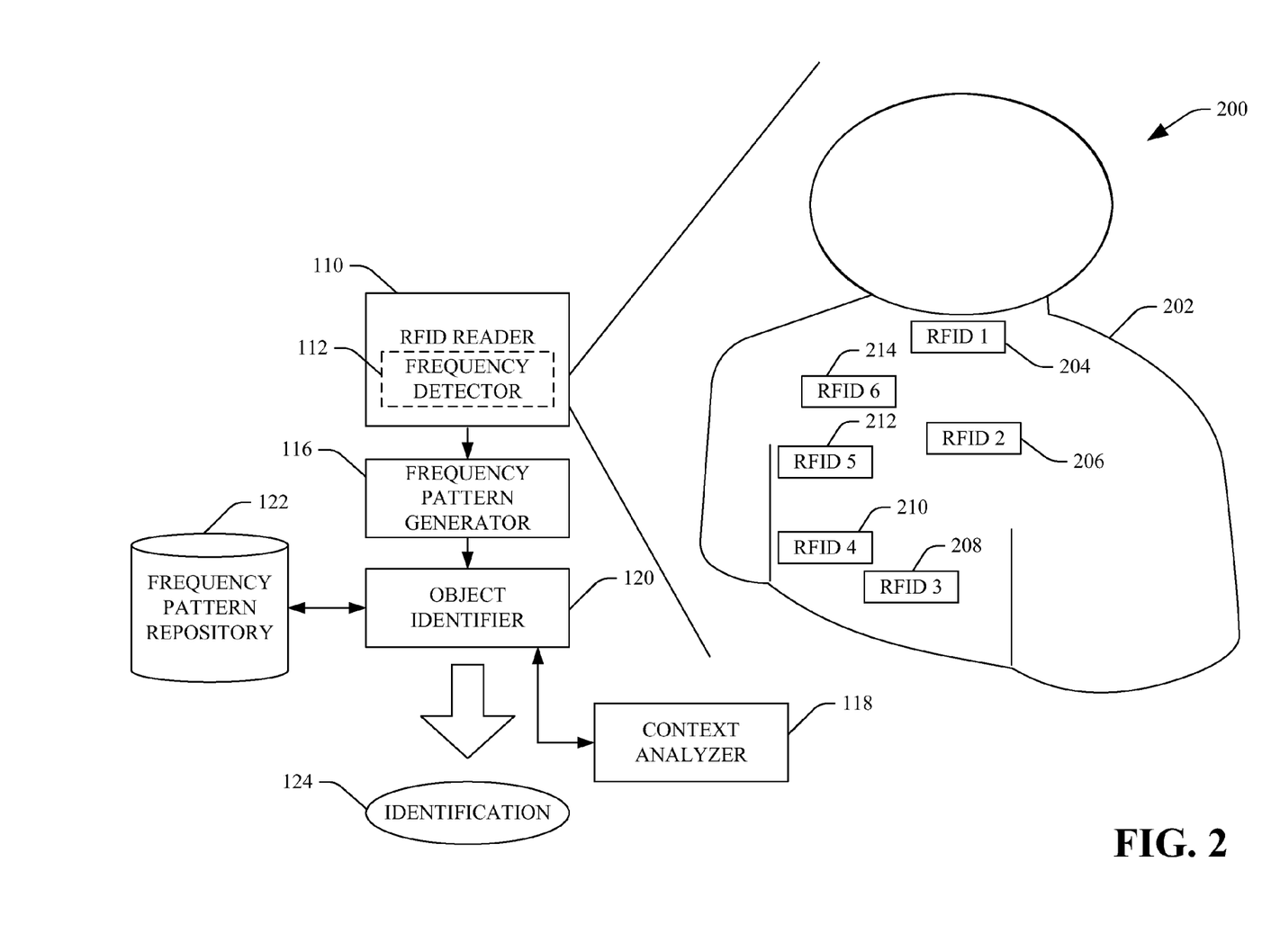
FIG. 2 depicts an apparatus that identifies an object.

Referring now to FIG. 2, an example apparatus 200 that identifies an object is illustrated. In this example, the object to be identified is abstract—a treatment plan for a patient 202, such as what medicine a patient requires, location (e.g., operating room, emergency room, . . . ) a patient should be directed to, and the like. A plurality of devices are attached to the patient 202 or embedded in the patient 202, and each of the devices has a corresponding RFID tag. In this example, a first RFID tag 204 corresponds to a microphone, a second RFID tag 206 corresponds to an oxygen sensor, a third RFID tag 208 corresponds to a blood-pressure sensor, a fourth RFID tag 210 corresponds to an accelerometer, a fifth RFID tag 212 corresponds to a temperature sensor, and a sixth RFID tag 214 corresponds to an electrocardiogram. A subset of the RFID tags 204-214 are designed to transmit information at frequencies that are conventionally not used by RFID tags—accordingly, a frequency at which an RFID tag transmits information is indicative of an identity of the RFID tag and thus indicative of an entity that corresponds to the RFID tag. For instance, a subset of the RFID tags may be designed in accordance with SARA protocols.

The RFID reader 110 outputs radio waves that are used to power the RFID tags 204-214 if they are passive RFID tags. The RFID reader 110 also optionally receives content of one or more of the RFID tags 204-214. The frequency detector 112 performs a frequency scan on the patient 202 and detects frequencies used by the RFID tags 204-214. The frequency pattern generator 116 generates a frequency pattern based upon the frequencies detected by the frequency detector 112. The object identifier 120 receives the frequency pattern determined by the frequency pattern generator 116 and also receives a current context (e.g., healthcare treatment plans) from the context analyzer 118. The object identifier 120 accesses the frequency pattern repository 122 and compares frequency patterns therein that correspond to the determined context with the frequency pattern generated by the frequency pattern generator 116. The object identifier 120 identifies the object (e.g., the treatment plan for the patient 202) based upon the comparison and outputs the identification 124.

Figure 3:
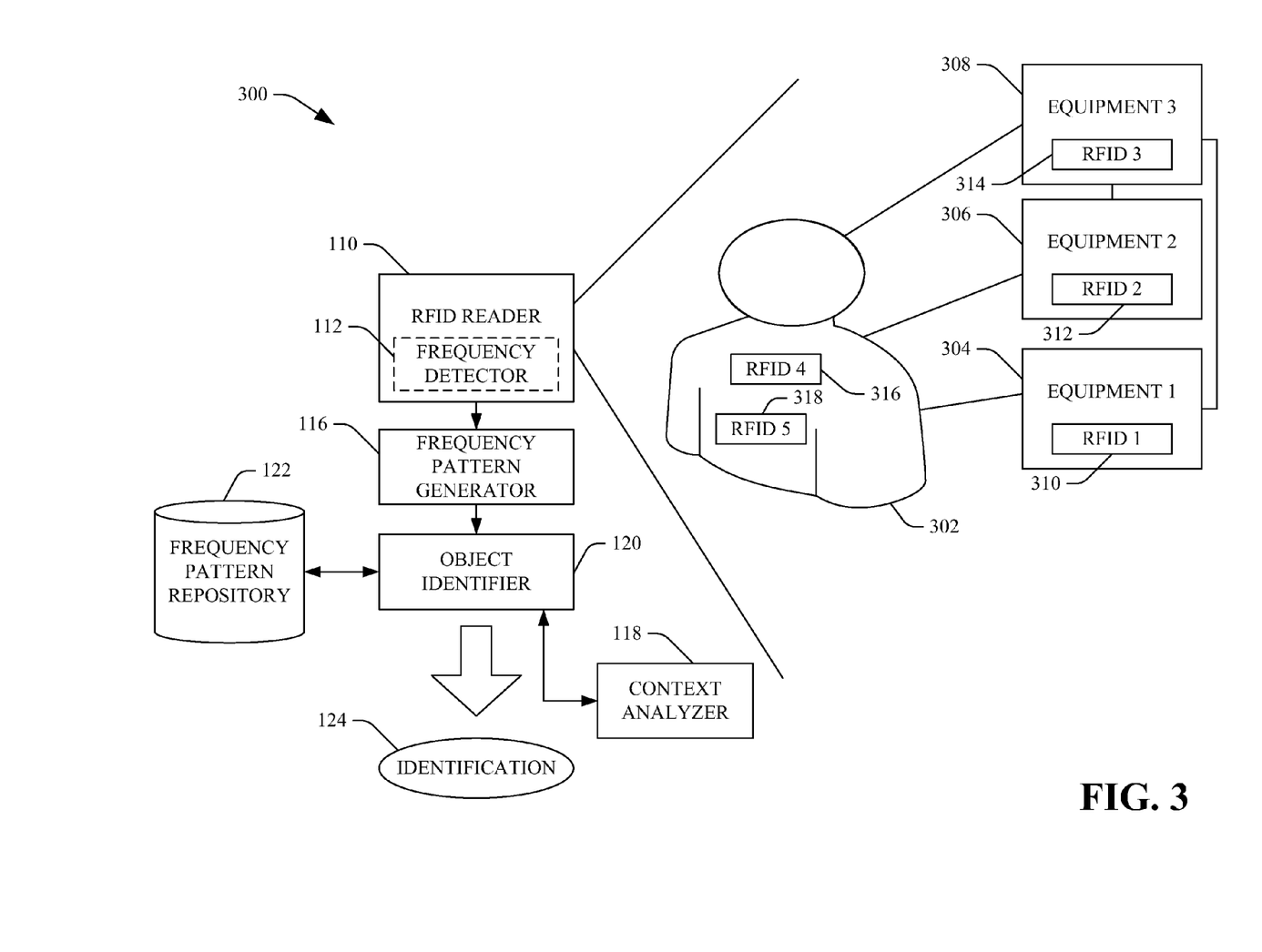
FIG. 3 depicts an apparatus that identifies an object.

Now referring to FIG. 3, an example apparatus 300 for identifying an object is illustrated. In the example depicted in this figure, the object is again intangible—the configuration of healthcare equipment with respect to a patient 302. First and second pieces of equipment, 304 and 306, respectively, monitor parameters of the patient 302. In an example, the first piece of equipment 304 is a processing device that processes the heart rate of the patient 302 and the second piece of equipment 306 is a processing device that processes the blood pressure of the patient 302. A third piece of equipment 308 is a display monitor that displays processed information output by the first and second pieces of equipment 304 and 306, respectively. First, second, and third RFID tags 310, 312, and 314 correspond with the first, second, and third pieces of equipment 304, 306, and 308, respectively. Fourth and fifth RFID tags 316 and 318 correspond to sensors, coupled to the patient 302, that are used to detect heart rate and blood pressure of the patient, and correspond to equipment 304 and 306, respectively. As noted above, frequencies used by the RFID tags 310-318 are not confined to conventional frequencies of RFID tags, and thus a frequency is indicative of an identity of an object.

The RFID reader 110 outputs radio waves that are used to power the RFID tags 310-318 if they are passive RFID tags. The RFID reader 110 also optionally receives content of one or more of the RFID tags 310-318. The frequency detector 112 performs a frequency sweep on the patient and detects frequencies used by the RFID tags 310-318, and the frequency pattern generator 116 generates a frequency pattern based upon the frequencies detected by the frequency detector 112. The object identifier 120 receives the frequency pattern determined by the frequency pattern generator 116 and also receives a current context (e.g., healthcare configurations) from the context analyzer 118. The context is either set by an operator of the apparatus 300 or automatically set based upon location of the apparatus 300, time of day, day of week, or other suitable information. The object identifier 120 accesses the frequency pattern repository 122 and compares frequency patterns therein that correspond to the determined context with the frequency pattern generated by the frequency pattern generator 116. The object identifier 120 identifies the object (e.g., the configuration of healthcare equipment with respect to the patient 202) based upon the comparison and outputs the identification 124.

Figure 4:
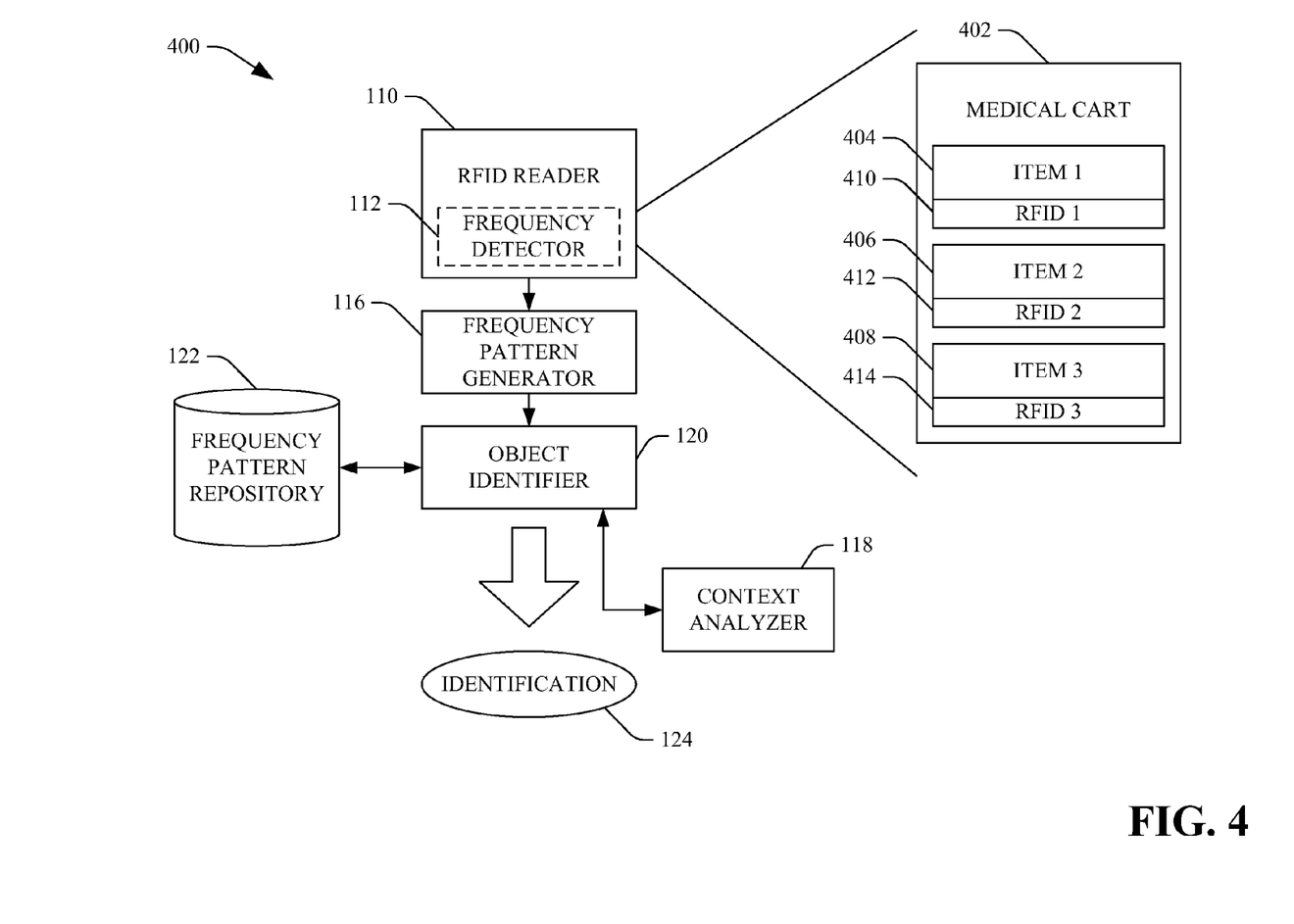
FIG. 4 depicts an apparatus that identifies an object.

Now turning to FIG. 4, an example apparatus 400 for identifying an object is depicted. In the example shown in FIG. 4, the object to be identified is a composition of substances on a medical cart 402. For example, the medical cart 402 may include several hundred medicine containers, and it may be desirable to quickly determine if the medical cart 402 includes any controlled substances. Using aspects described herein, frequencies used by RFID tags on the medical cart 402 can be determined and used to ascertain a composition of substances.

In this example, the medical cart 402 includes three different items 404, 406, and 408. For instance, the items 404-408 are containers that include medical substances. Each of the items 404, 406, and 408 has a corresponding RFID tag 410, 412, and 414, wherein the RFID tags 410-414 transmit at different frequencies (e.g., frequencies that are not conventionally used by RFID tags).

The RFID reader 110 outputs radio waves that are used to power the RFID tags 410-414 if they are passive RFID tags. The frequency detector 112 performs a frequency scan on the medical cart 402 and detects frequencies used by the RFID tags 410-414. The frequency pattern generator 116 generates a frequency pattern based upon the frequencies detected by the frequency detector 112. The object identifier 120 receives the frequency pattern determined by the frequency pattern generator 116 and also receives a current context (e.g., medical cart compositions) from the context analyzer 118. The object identifier 120 accesses the frequency pattern repository 122 and compares frequency patterns therein that correspond to the determined context with the frequency pattern generated by the frequency pattern generator 116. The object identifier 120 identifies the object (e.g., the composition of the medical cart 402) based upon the comparison and outputs the identification 124. Similar comparisons can be used to track inventory.

While heretofore it has been described that objects are identified based solely upon frequencies used by RFID tags (e.g., a frequency pattern), it is to be understood that other information may be used together with frequency information to identify an object. For example, location information determined by the location detector 114 can be used together with the frequency information to identify an object (e.g., location of items with respect to one another may be indicative of object identity). Additionally, identity of one or more RFID tags and/or content of one or more RFID tags may be used to identify an object. For instance, an RFID tag may be represented as a tuple of <f, id, content>, where f is the frequency that the RFID tag uses to transmit information, id is the identification of the RFID tag, and content is the content saved in the memory of the RFID tag. More complex patterns can be expressed by using these three components of the tuple. In an example, a frequency pattern generated by the frequency pattern generator 116 may not uniquely identify an object. Accordingly, content of one or more RFID tags may be read to uniquely identify the object.

Moreover, while in the examples of FIGS. 2, 3, and 4 the context is described as being related to the healthcare field, it is to be understood that aspects described herein may be used in other contexts. For instance, objects (tangible or intangible) in a retail setting, in an industrial setting, or other suitable setting are identifiable by using frequency patterns. Thus, for example, aspects described herein may be used in connection with inventory tracking in an industrial, retail, healthcare, etc. environment, quality control in an industrial, retail, healthcare, etc. environment, and the like. In other examples, aspects described herein may be used to verify/suggest treatment in a healthcare facility, relay data to a hospital information system (HIS), a radiology information system (RIS), or other suitable healthcare systems. Still further, aspects described herein may be employed in connection with identifying an object and determining whether the object has security clearance with respect to a desirably accessed area based upon a current context, identifying items in a recipe for a batch application, such as manufacture of pharmaceuticals, and other applications.

Accordingly, a context used to identify a tangible or intangible object may be administrative, such that an administrator defines an enterprise. For example, an enterprise may be a healthcare institution including hospitals and clinics, a group of manufacturing facilities, etc. Context may also be defined by a regulatory body, such as the Food and Drug Administration, and used to identify objects that are to be regulated. In yet another example, context may be used in a security setting. For instance, a context may be defined by a location, a time, or a condition related to a security state. For example, at times of different threat alert levels (e.g., color-coded terrorism alert levels such as Blue, Orange, Red; defense condition (DEFCON) levels 1 through 5; etc.) different contexts may be applied to different geographical areas, depending upon the current existing alert level. Context may also be defined by weather conditions, such that a tangible or intangible object is identified based at least in part upon current weather conditions such as temperature, humidity, particles detected in the air (rain, snow, sand, etc.). Still further, these and other contexts may depend upon space (geographic coordinates), space, time, user identity, security condition, user activity, and many more. Accordingly, it can be discerned that aspects herein may be used in a wide variety of industries and contexts, and are not limited to use in the field of healthcare.

Figure 5:
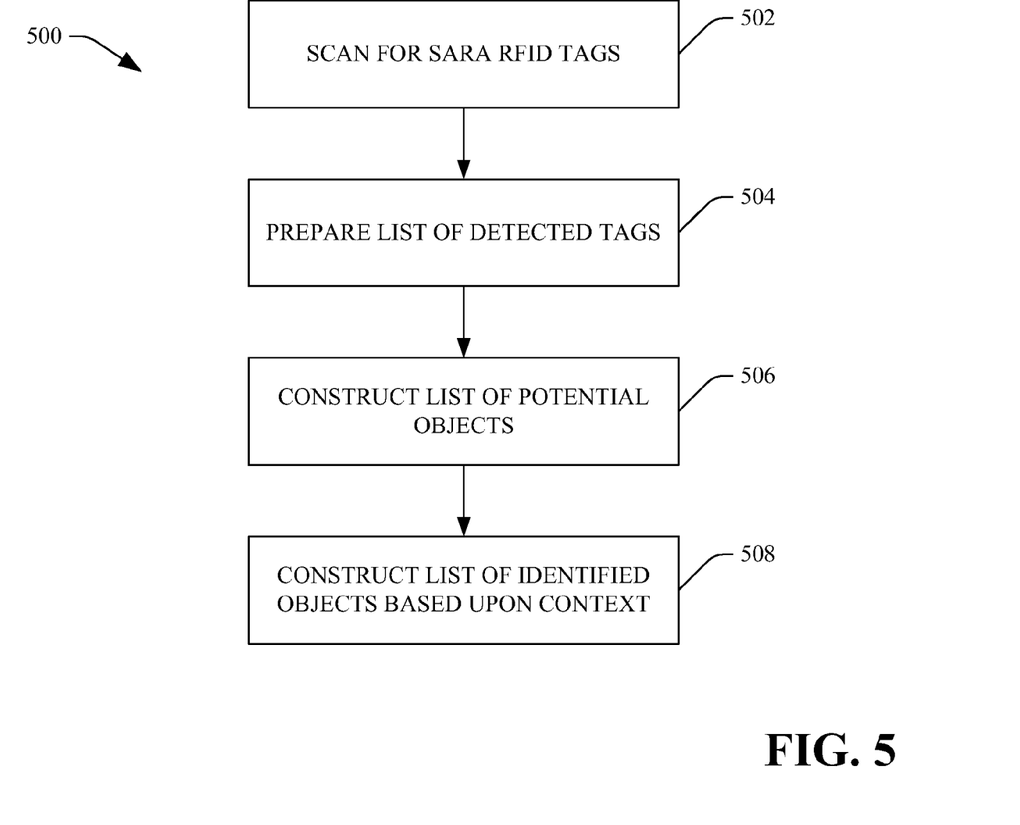
FIG. 5 depicts a method for identifying an object.

Referring now to FIG. 5, a method 500 for identifying an object is illustrated. At 502, a scan for SARA RFID tags is undertaken. SARA RFID tags are designed to operate in accordance with SARA protocols, and therefore may transmit over frequencies that are not conventionally used by RFID tags. At 504, a list of detected tags is prepared, wherein the list is prepared based upon detected frequencies of the SARA RFID tags. An example list is (1 f1, 1 f2, 1 f3, 1 f4, 1 f5, 1 f6).

At 506, a list of potential objects is constructed, wherein the potential objects have a threshold amount of similarity with respect to frequencies of SARA RFID tags. An example list of potential objects is the following: Object 1=(1 f1, 1 f2, 1 f3, 1 f4, 1 f5, 1 f6), Object 2=(1 f4, 1 f5, 1 f6), and Object 3=(1 f1, 1 f3, 1 f5).

At 508, a list of identified objects is constructed based upon context. Continuing with the above example, the context may indicate that Object 1 is the object identified.

Figure 6:
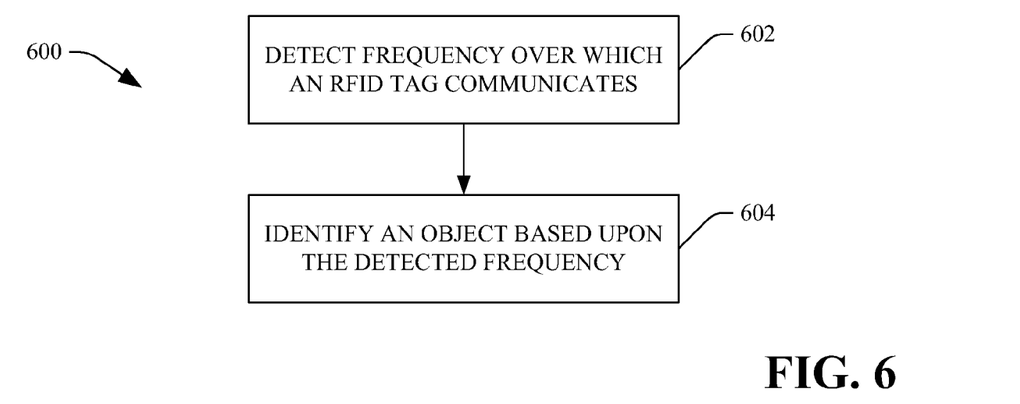
FIG. 6 depicts a method for identifying an object.

Referring now to FIG. 6, a method 600 for identifying an object is illustrated. At 602, a frequency over which an RFID tag communicates is detected. As described above, a frequency can be indicative of an identity of an RFID tag. At 604, the object is identified based at least in part upon the detected frequency.

Figure 7:
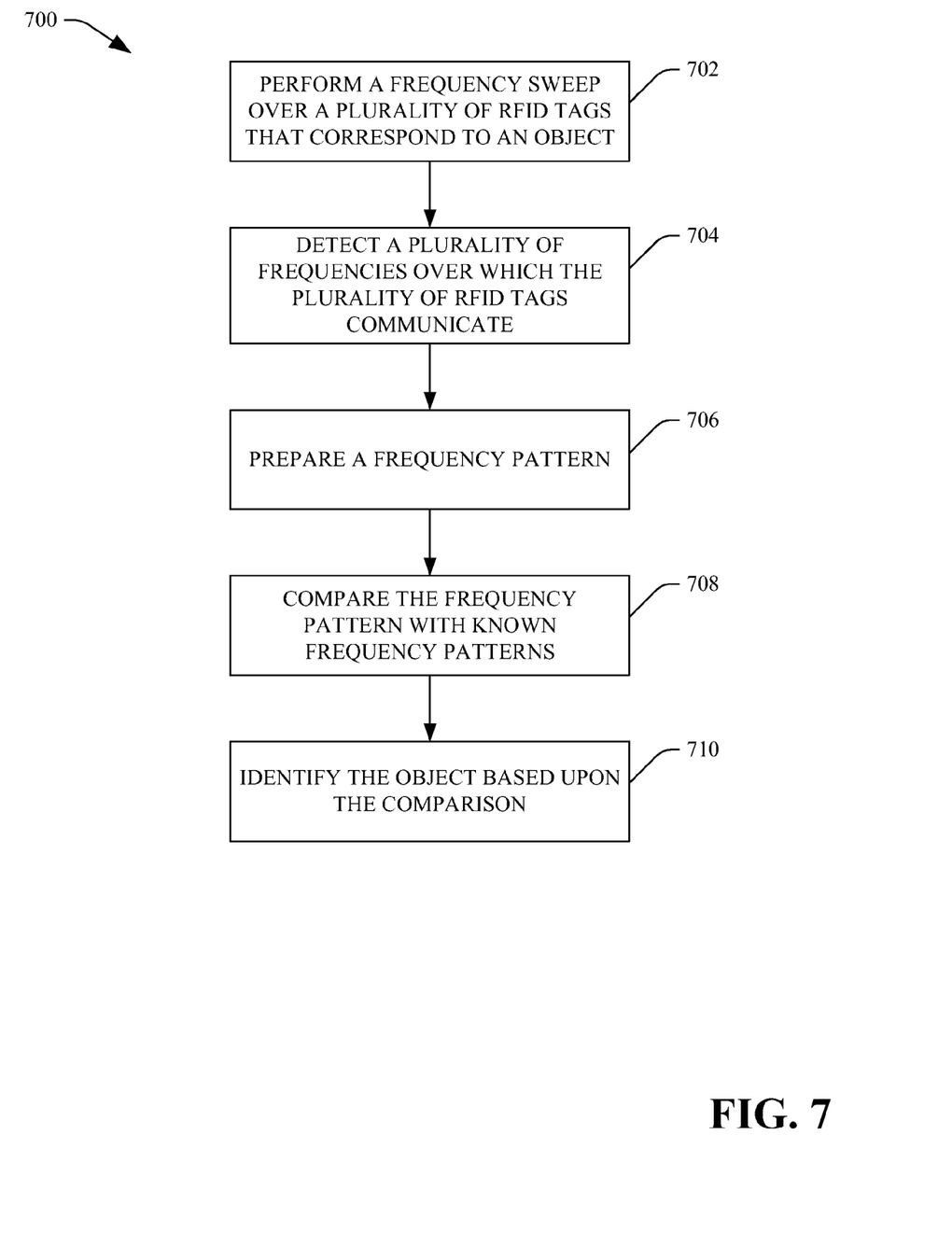
FIG. 7 depicts a method for identifying an object.

Turning to FIG. 7, a method 700 for identifying an object is illustrated. At 702, a frequency sweep is performed over a plurality of RFID tags that correspond to an object. At 704, a plurality of frequencies over which the plurality of RFID tags communicate are detected, and at 706 a frequency pattern is prepared.

At 708, the frequency pattern is compared with known frequency patterns. At 710, the object is identified based upon the comparison.

As can be discerned, functions performed by one or more of the modules described above can be realized by executing instructions in a computer-readable medium. For instance, a processor may access a computer-readable medium and execute instructions therein to detect frequencies used by RFID tags, generate frequency patterns, and compare frequency patterns with known frequency patterns.

Of course, modifications and alterations will occur to others upon reading and understanding the preceding description. It is intended that the invention be construed as including all such modifications and alterations insofar as they come within the scope of the appended claims or the equivalents thereof.

What is claimed is:

1. An apparatus that identifies an object, comprising:
a plurality of RFID tags disposed with the object, wherein each RFID tag includes an integrated circuit for storing information in memory, processing information, and modulating or demodulating a radio frequency (RF) signal and an antenna for receiving and transmitting RF signals;
an RFID reader that receives signals including information comprising content stored in memory from the plurality of RFID tags, the RFID reader further including a frequency detector that detects a plurality of frequencies over which the plurality of RFID tags transmit said information;
a frequency pattern generator that receives frequency information detected by the RFID reader and generates a frequency pattern based on the received frequency information, the frequency pattern having the general form {Af1; Bf2; . . . Xfn}, where A, B, . . . X are integers that indicate the number of RFID tags that transmit respective signals including information over each respective frequency f1, f2, . . . , fn, and n is a number of frequencies detected; and
an object identifier that receives the generated frequency pattern and compares the generated frequency pattern to known frequency patterns and, based on the comparison, identifies the object.

2. The apparatus of claim 1, further comprising a context analyzer that outputs a context that corresponds to the object, wherein the object identifier determines the identity of the object further based upon the output context.

3. The apparatus of claim 1, wherein the RFID reader outputs radio signals that power the plurality of RFD tags.

4. The apparatus of claim 3, wherein the RFID reader reads content of memories of the plurality RFID tags and the object identifier identifies the object further based upon the read content.

5. The apparatus of claim 1 being an inventory-tracking apparatus.

6. The apparatus of claim 1, wherein the RFID reader further includes a location detector that detects locations of the RFID tags.

7. A method for identifying an object, comprising:
disposing a plurality of RFID tags with an object wherein each RFID tag includes an integrated circuit for storing information in memory, processing information, and modulating or demodulating a radio frequency (RF) signal and an antenna for receiving and transmitting RF signals;
receiving signals from the plurality of RFID tags wherein the signals include information comprising content stored in memory of the RFID tags;
detecting a plurality of frequencies over which the plurality of RFID tags transmit the signals including said information;
determining a number of RFID tags that communicate signals including ad information over each of the detected frequencies; and
generating a frequency pattern comprising a list of the detected frequencies and the number of RFID tags that communicate signals including said information over each of the detected frequencies based on the detected plurality of frequencies used by the plurality of RFID tags to transmit information and the determined number of RFID tags that communicate over each of the detected frequencies; and
comparing the generated frequency pattern to known frequency patterns and identifying the object based at least in part upon the comparison.

8. The method of claim 7, further comprising
receiving content from the memories of the plurality of RFID tags; and
identifying the object further based upon the received content.

9. The method of claim 7, wherein the object corresponds to a healthcare environment.

10. The method of claim 7, wherein the identifying is further based at least in part upon a defined context.

11. The method of claim 10, wherein the context is defined based at least in part upon a current security setting or based at least in part upon current weather conditions.

12. The method of claim 7, wherein each RFID tag of the plurality of RFID tags is one of a passive RFID tag, an active RFID tag, and a semi-active RFID tag.

13. The method of claim 7, further comprising providing an identity of the object to a hospital information system.

14. The method of claim 7, further comprising providing an identity of the object to a radiology information system.

15. A non-transitory computer-readable medium comprising instructions that, when executed by a processor, perform the following acts:
performing a frequency sweep to detect a plurality of frequencies over which a plurality of RFID tags transmit information and the number of RFID tags transmitting information at each detected frequency, wherein each RFID tag includes an integrated circuit for storing information, processing information, and modulating or demodulating a radio frequency (RF) signal and an antenna for receiving and transmitting RF signals;
generating a frequency pattern based on the detected plurality of frequencies and the detected number of RFID tags transmitting information at each detected frequency, wherein the frequency pattern is of the form {Af1; Bf2; . . . Xfn}, where A, B, . . . X are integers that indicate a number of RFID tags that transmit information over each detected frequency f1, f2, . . . , fn, and n is a number of frequencies detected; and identifying an object based at least in part upon comparing the generated frequency pattern including the number of RFID tags that transmit information at each detected frequency to known frequency patterns.

* * * * *